C. B. THORESEN.
FOLDING HAND SLED.
APPLICATION FILED NOV. 26, 1917.
1,289,964.
Patented Dec. 31, 1918.
2 SHEETS—SHEET 1.
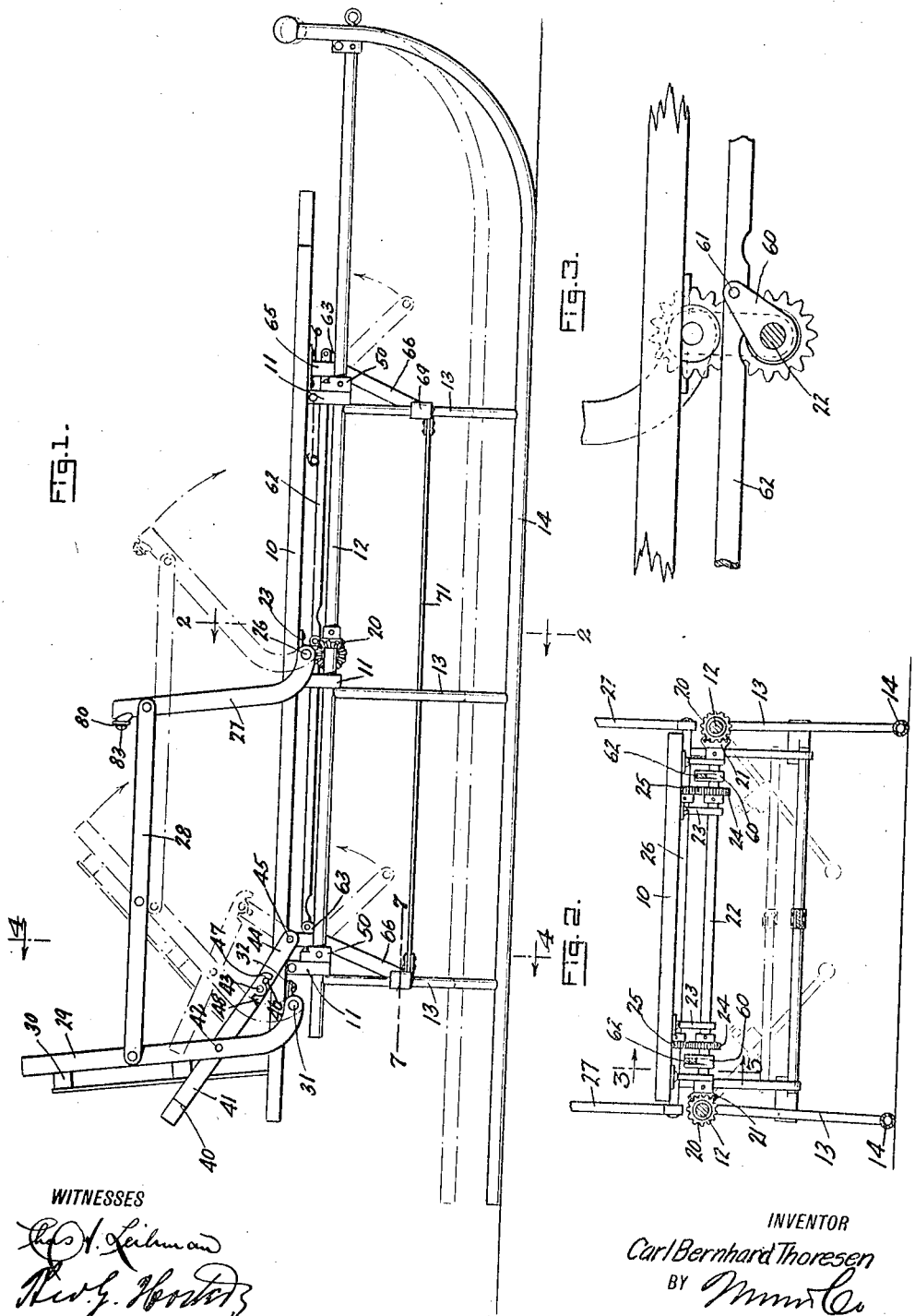
WITNESSES
INVENTOR
Carl Bernhard Thoresen
BY
ATTORNEYS

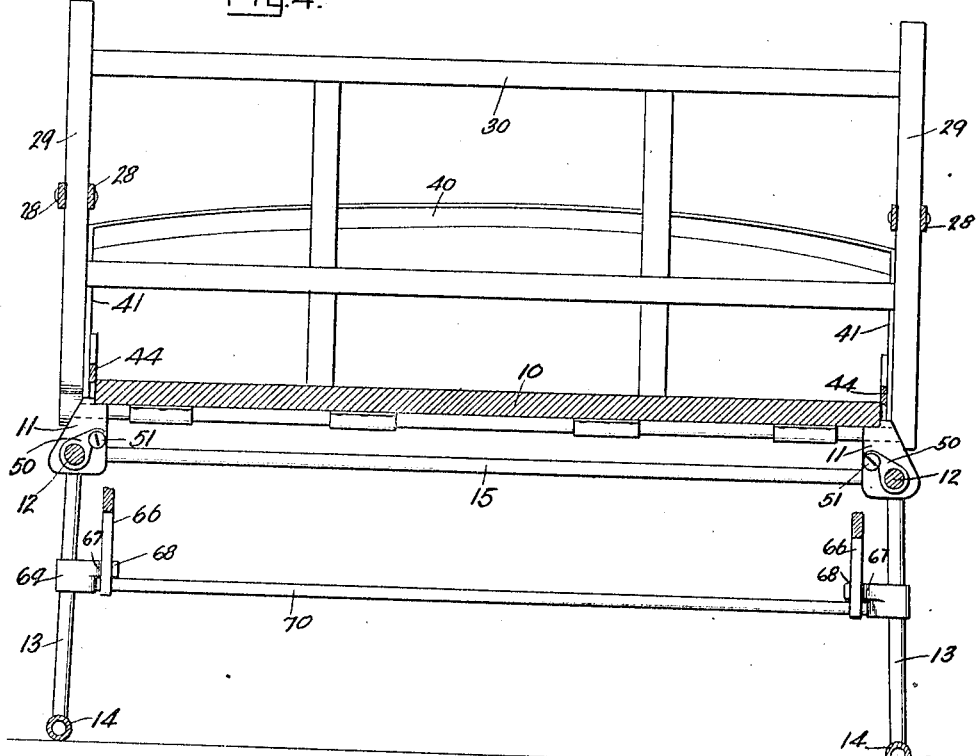
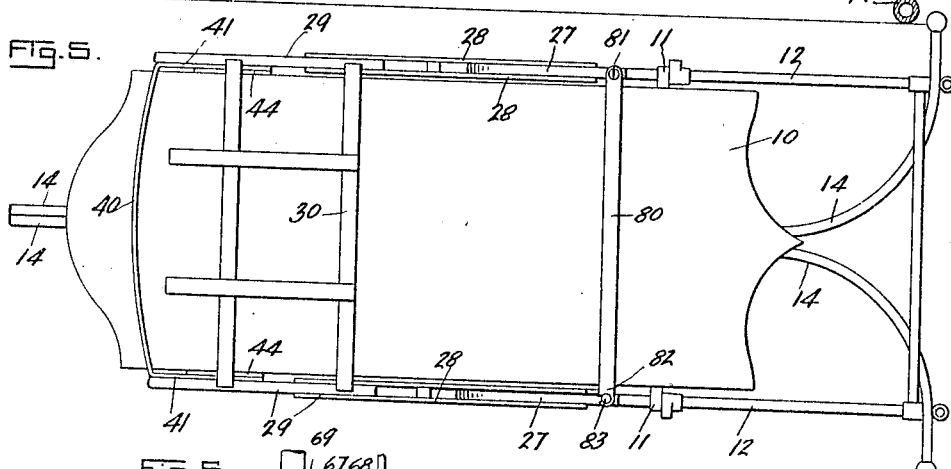
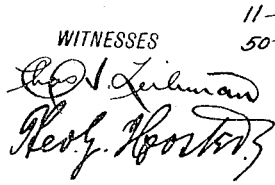

UNITED STATES PATENT OFFICE.

CARL BERNHARD THORESEN, OF BROOKLYN, NEW YORK.

FOLDING HAND-SLED.

1,289,964.	Specification of Letters Patent.	Patented Dec. 31, 1918.

Application filed November 26, 1917. Serial No. 203,955.

*To all whom it may concern:*

Be it known that I, CARL BERNHARD THORESEN, a citizen of the United States, and a resident of the city of New York, borough of Brooklyn, in the county of Kings and State of New York, have invented a new and Improved Folding Hand-Sled, of which the following is a full, clear, and exact description.

The object of the invention is to provide a new and improved hand sled arranged to permit of conveniently extending the sled for use or folding it to form a comparatively small flat bundle which can be readily carried about, or shipped, or stored without taking up much room.

In order to accomplish the desired result, use is made of a seat, runners mounted to swing on the said seat, a gearing mounted on the said seat and connected with the said runners to swing the latter into extended position or into folded position under said seat, a back rest mounted to swing on the said seat and connected with the said gearing to actuate the same, and a final spreading and locking device for the runners mounted on the said seat and controlled by the said gearing to move the runners into final extended and spread position and to lock the runners in this position.

A practical embodiment of the invention is represented in the accompanying drawings forming a part of this specification, in which similar characters of reference indicate corresponding parts in all the views.

Figure 1 is a side elevation of the hand sled with the parts in extended position;

Fig. 2 is a cross section of the same on the line 2—2 of Fig. 1;

Fig. 3 is an enlarged side elevation of a portion of the locking device for locking the runners when in extended position, the section being on the line 3—3 of Fig. 2;

Fig. 4 is an enlarged cross section of the hand sled on the line 4—4 of Fig. 1;

Fig. 5 is a plan view of the hand sled with the parts in folded position;

Fig. 6 is an enlarged plan view of part of the locking device for the runners, the section being on the line 6—6 of Fig. 1; and Fig. 7 is a sectional plan view of another part of the locking device, the section being on the line 7—7 of Fig. 1.

The seat or platform 10 of the hand sled is provided at the under side at the sides with bearings 11 in which are mounted to turn runner shafts 12 extending longitudinally and connected by rods 13 with runners 14. By the arrangement described the runners 14 can be swung into an approximately vertical position when it is desired to use the sled, as shown in Figs. 1, 2 and 4, or the runners can be swung toward each other into folded position on the under side of the seat or platform 10, as indicated in Fig. 5. Oppositely disposed bearings 11 on the sides of the platform 10 are rigidly connected with each other by crossbars 15 to strengthen the said bearings and thus prevent binding of the runner shafts 12 in the said bearings. On the runner shafts 12 and near the middle thereof are secured bevel gear wheels 20 in mesh with bevel gear wheels 21 secured on the ends of a transverse shaft 22 journaled in suitable bearings arranged in brackets 23 attached to the under side of the seat 10. On the shaft 22 are secured gear wheels 24 in mesh with pinions 25 secured on a shaft 26 journaled in bearings arranged on the brackets 23 and on the outer ends of the shafts 26 are secured upwardly extending arms 27 connected by rearwardly extending links 28 pivotally connected with the side arms 29 of a back rest 30 provided with a transverse shaft 31 journaled in bearings 32 attached to the under side of the seat or platform 10. When the back rest 30 is in normal supporting position, as shown in Figs. 1, 2 and 4, then the runners 14 are in extended position, and when it is desired to fold the runners it is only necessary for the operator to take hold of the back rest 30 and swing the same forward to cause the links 28 to impart a swinging motion to the arms 27 which turns the shaft 26, and the latter by the pinion 25 and gear wheel 24 turns the shaft 22 which by the bevel gear wheels 21 and 20 turns the shafts 12 to swing the runners 14 toward each other into folded position on the under side of the seat or platform 10.

The back rest 30 is held locked in extended position by a locking device formed of a U-shaped lever 40 having its side arms 41 pivoted at 42 on the side arms 29 of the back rest 30. The forward ends of the side arms 41 are pivotally connected at 43 with links 44 pivoted at 45 on the sides of the seat 10, and the said links 44 are provided with pins 46 adapted to be engaged by hooks 47 formed on the forward ends of the side arms 41 of the locking lever 40. When the hooks 47 engage the pins 46 then the side arms 41 and the links 44 are slightly out of alinement, as plainly indicated in Fig. 1, to hold the locking lever 40 from accidentally opening unless the lever is first pressed downward to disengage the hooks 47 from the pin 46. The side arms 41 are provided in the rear of the pivots 43 with notches 48 adapted to be engaged by the pins 46 at the time the parts are in the folded position shown in Fig. 5.

In order to prevent the runners 14 from swinging too far outward, use is made of stop lugs 50 (see Figs. 1 and 4) secured on the runner shafts 12 and adapted to engage stop pins 51 attached to the adjacent bearings 11.

In order to assist the actuating device for the runners to move the latter into final extended position and to lock the levers in this position and against accidentally collapsing, use is made of a spreading and folding device controlled from the shaft 22 of the gearing employed for imparting a swinging motion to the runners 14, as previously explained. On the shaft 22 are secured arms 60 (see Figs. 2 and 3) connected by pins 61 with longitudinally extending rods 62 pivotally connected at their ends with arms 63 secured on a transversely extending shaft 64 journaled in suitable bearings 65 attached to the under side of the seat or platform 10. On the shaft 64 are secured downwardly extending arms 66 adapted to engage cam faces 67 and notches 68 formed on keepers 69 attached to the foremost and rearmost bars 13 connecting the shafts 12 with the runners 14. It is understood that when the shaft 22 is turned, as previously explained, on swinging the back rest 30 forward then the arms 60 impart a forward movement to the links 62 which by the arms 63 turn the shaft 64. The turning movement given to the shaft 64 causes the arms 66 to engage the cam faces 67 thus pushing the keepers 69 in an outward direction until the arms finally pass into the notches 68 to lock the keepers 69 and consequently to lock the runners 14 in final extended position. The lower ends of the oppositely disposed arms 66 are connected with each other by cross rods 70 pivotally connected with each other by a reach rod 71 to insure simultaneous movement of the front and rear pairs of arms 66. The upper ends of the arms 27 are adapted to be connected with each other by a crossbar 80 pivoted at 81 on one of the arms 27 and having at its free end a hook 82 engaging a pin 83 on the other arm 27, as will be readily understood by reference to Figs. 1 and 5. This crossbar 80 is closed after a child has been seated on the extended sled to hold the child against falling off when the sled is used.

When the several parts are in the position shown in Figs. 1, 2, 3 and 4, then the runners 14 are locked in extended position and the sled can be used in the usual manner.

When it is desired to fold the sled into a small flat bundle then the user first bears down on the locking lever 40 to unlock the back rest 30 which is now swung forwardly and downwardly to impart a rocking motion to the runner shafts 12 and thereby swing the runners 14 toward each other into a folded position under the seat or platform 10. It is understood that when the runner shafts 12 begin to turn, a swinging motion is given to the arms 66 to disengage the same from the notches 68 to allow ready inward and upward swinging movement of the runners 14, as above explained. By swinging the back rest 29 forward, it is folded close to the top of the platform 10 together with the links 28, the arms 27 and the locking lever 40. The sled in this folded position takes up very little room and can be readily carried about, or shipped, or stored.

When it is desired to use the sled the operator takes hold of the lever 40 and swings the same rearwardly and upwardly thus imparting a return turning movement to the runner shafts 12 whereby the runners swing apart into an approximately vertical position, and during this movement the arms 66 engage the cam faces 67 to move the runners into final extended position. The arms 60 next engage the notches 68 thus locking the runners in this extended position. The operator also imparts an upward swinging movement to the lever 40 to lock the back rest 30 against accidental folding movement.

Having thus described my invention, I claim as new and desire to secure by Letters Patent:—

1. A folding hand sled, comprising a seat, runners mounted to swing on the said seat, a gearing mounted on the said seat and connected with the said runners to swing the latter into extended position or into folded position under the said seat, a back rest mounted to swing on the said seat and connected with the said gearing to actuate the same, and a final spreading and locking device for the runners mounted on the said seat and controlled by the said gearing to move the runners into final extended and spread position and to lock the runners in this position.

2. A folding hand sled, comprising a seat, runners mounted to swing on the said seat, a gearing mounted on the said seat and connected with the said runners to swing the latter into extended position or into folded position under the said seat, a back rest mounted to swing on the said seat and connected with the said gearing to actuate the same, a final spreading and locking device for the runners mounted on the said seat and controlled by the said gearing to move the runners into final extended and spread position and to lock the runners in this position, and a locking device mounted on the said seat and connected with the said back rest to lock the latter when in extended position.

3. A folding hand sled, comprising a seat, runners provided with longitudinal shafts journaled on the under side of the said seat at the sides thereof to permit of swinging the runners into extended approximately vertical position for use or into a folded position under the seat, bevel gear wheels on the said runner shafts, a transverse shaft journaled on the under side of the said seat and provided with bevel gear wheels in mesh with the said bevel gear wheels on the runner shaft, a rock shaft journaled on the under side of the said seat and geared with the said transverse shaft, arms extending upwardly from the ends of the said rock shaft, a back rest mounted to swing on the rear end of the said seat, and links connecting the said back rest with the said arms.

4. A folding hand sled, comprising a seat, runners provided with longitudinal shafts journaled on the underside of the said seat at the sides thereof to permit of swinging the runners into extended approximately vertical position for use or into a folded position under the seat, bevel gear wheels on the said runner shafts, a transverse shaft journaled on the under side of the said seat and provided with bevel gear wheels in mesh with the said bevel gear wheels on the runner shaft, manually controlled actuating means for turning the said transverse shaft in either direction, and a spreading and locking device mounted on the under side of the seat and controlled from the said transverse shaft, the said spreading and locking device being adapted to engage the said runners to swing the same into final extended position and to lock the runners in this position.

5. A folding hand sled, comprising a seat, runners provided with longitudinal shafts journaled on the under side of the said seat at the sides thereof to permit of swinging the runners into extended approximately vertical position for use or into a folded position under the seat, bevel gear wheels on the said runner shafts, a transverse shaft journaled on the under side of the said seat and provided with bevel gear wheels in mesh with the said bevel gear wheels on the runner shaft, manually controlled actuating means for turning the said transverse shaft in either direction, arms on the said transverse shaft, longitudinally extending links connected with the said arms, rock shafts extending transversely and journaled on the under side of the seat near the front and rear ends thereof, connecting arms on the said rock shafts and connected with the said links, locking arms depending from the said rock shafts, and keepers on the said runners and adapted to be engaged by the said locking arms to lock the runners in extended position.

6. A folding hand sled, comprising a seat, runners provided with longitudinal shafts journaled on the under side of the said seat at the sides thereof to permit of swinging the runners into extended approximately vertical position for use or into a folded position under the seat, bevel gear wheels on the said runner shafts, a transverse shaft journaled on the under side of the said seat and provided with bevel gear wheels in mesh with the said bevel gear wheels on the runner shaft, manually controlled actuating means for turning the said transverse shaft in either direction, arms on the said transverse shaft, longitudinally extending links connected with the said arms, rock shafts extending transversely and journaled on the under side of the seat near the front and rear ends thereof, connecting arms on the said rock shafts and connected with the said links, locking arms depending from the said rock shafts, and keepers secured on the said runners and having cam faces and notches adapted to be engaged by the said locking arms to move the runners into final extended position and to lock the runners in this extended position.

7. A folding hand sled, comprising a seat, runners provided with longitudinal shafts journaled on the underside of the said seat at the sides thereof to permit of swinging the runners into extended approximately vertical position for use, or into a folded position under the seat, bevel gear wheels on the said runner shafts, a transverse shaft journaled on the under side of the said seat and provided with bevel gear wheels in mesh with the said bevel gear wheels on the runner shaft, manually controlled actuating means for turning the said transverse shaft in either direction, arms on the said transverse shaft, longitudinally extending links connected with the said arms, rock shafts extending transversely and journaled on the under side of the seat near the front and rear ends thereof, connecting arms on the said rock shafts and connected with the said links, locking arms depending from the said rock shafts, and keepers secured on the said runners and having cam faces and notches adapted to be engaged by the said locking arms to move the runners into final extended position and to lock the runners in this extended position.

CARL BERNHARD THORESEN.

Copies of this patent may be obtained for five cents each, by addressing the "Commissioner of Patents, Washington, D. C."